United States Patent Office 3,182,046
Patented May 4, 1965

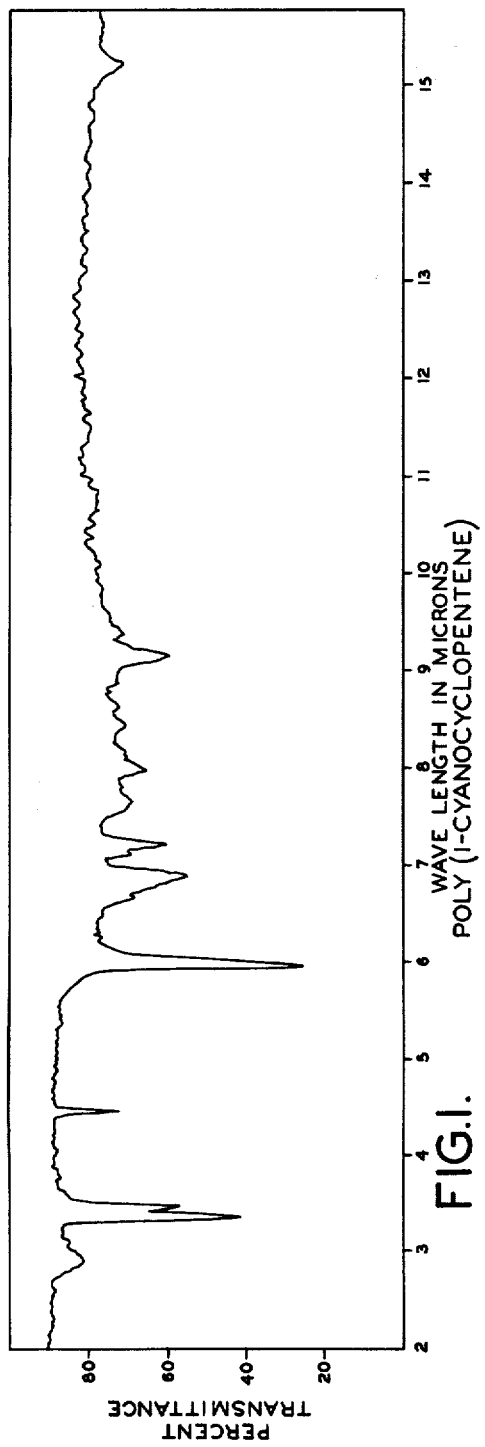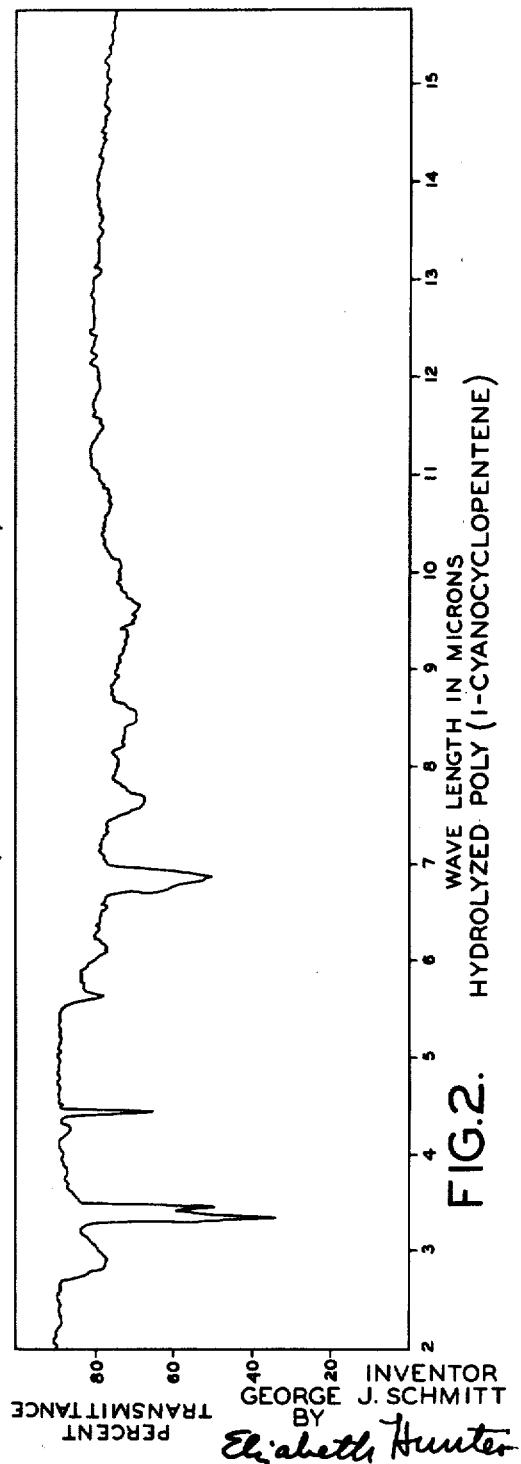

3,182,046
POLYMERS OF 1-CYANOCYCLOPENTENES
AND PROCESS FOR PREPARING THEM
George J. Schmitt, Madison, N.J., assignor to Allied Chemical Corporation, New York, N.Y., a corporation of New York
Filed May 26, 1961, Ser. No. 112,885
8 Claims. (Cl. 260—88.7)

This invention relates to a process for the production of polymers from 1-cyanocyclopentene and to the resulting polymeric products.

I have discovered that 1-cyanocyclopentene can be polymerized as described hereinafter, to give high yields of solid polymers having a high degree of stability against the decompositional effects of heat and against attack of most commonly encountered liquid materials.

The primary object of my invention, therefore is to provide novel polymers which have high resistance against the destructive action of heat.

A further object of the invention is to produce novel polymers of great chemical inertness and resistance to attack by the usually encountered solvents and chemical reagents.

These and other objects are accomplished according to my invention wherein 1-cyanocyclopentene is polymerized in the liquid phase at temperatures between about −80° C. and +200° C. in the presence of an alkali metal as catalyst and a polar compound having a dielectric constant high enough to solvate the electron provided by the metal catalyst, but low enough so that the polar compound does not provide a proton which would inhibit the polymerization reaction. The resulting poly(1-cyanocyclopentene) may then be hydrolyzed as by treatment with aqueous acid to produce the hydrolyzed form of poly(1-cyanocyclopentene) wherein the imino groups have been converted to amido groups.

The polymerization according to my invention proceeds as illustrated below.

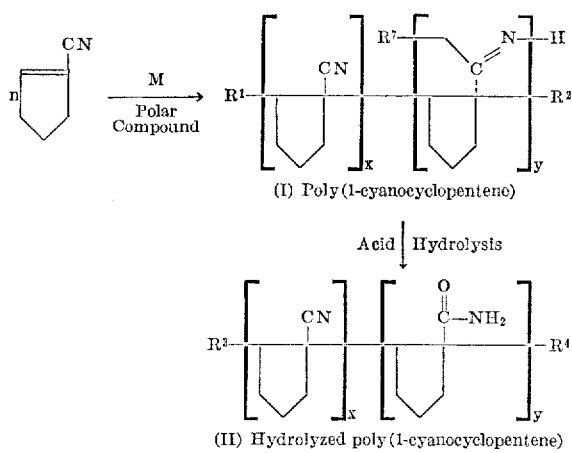

(I) Poly(1-cyanocyclopentene)

Acid | Hydrolysis (II) Hydrolyzed poly(1-cyanocyclopentene)

In the above equations, M is an alkali metal or an alkali metal yielding compound, $n$ is an integer of not less than about 60, $x$ and $y$ are integers of at least 45 and 15 respectively, the ratio of $x$ to $y$ is at least 3:1 and the $y$ groups are interspersed throughout the polymer in connected units of at least three members; $R^1$, $R^2$, $R^3$ and $R^4$ are terminal groups of which $R^1$ may be hydrogen, cyanocyclopentyl or iminocyclopentyl radicals; $R^2$ may be hydrogen or a cyanocyclopentyl radical; $R^3$ may be hydrogen, cyanocyclopentyl or amidocyclopentyl radicals and $R^4$ may be hydrogen or a cyanocyclopentyl radical. $R^7$ represents the negative radical of the polar compound, for example when the polar compound is ammonia or an organic amine, $R^7$ represents $NH_2$ or the corresponding amino radical.

In the polymer chain as above described a minimum of three iminocyclopentyl groups occur in sequence, bonded as shown below.

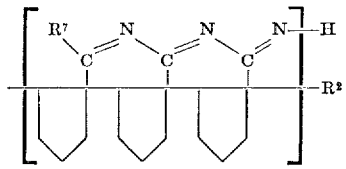

which upon acid hydrolysis becomes

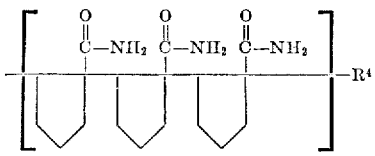

In the drawings, FIGURE 1 represents the infrared spectrogram of poly(1-cyanocyclopentene). FIGURE 2 represents the infrared spectogram of hydrolyzed poly-(1-cyanocyclopentene).

It will be noted from FIGURE 1, that poly(1-cyanocyclopentene) has characteristic infrared absorption peaks at 3.35–3.43 microns indicative of CH and $CH_2$ groups; at 4.44 microns indicative of the nitrile group —C≡N; at 5.93 microns indicative of the imine group

The absorption band at 6.85 microns shows the presence of an amide group, not truly characteristic of this polymer and due presumably to contamination of the poly-(1-cyanocyclopentene), with traces of terminal amide groups. Absorption peaks also appear at 7.2 microns and at 9.2 microns, both indicative of CH and $CH_2$ groups.

FIGURE 2 shows characteristic infrared absorption peaks at 3.35–3.43 microns due to CH and $CH_2$ groups; a less intense absorption at 4.44 microns due to the nitrile group. The absorption peak at 5.93 due to the imine group has virtually disappeared, and has been replaced by a strong absorption band at 6.85 microns due to the presence of the amide

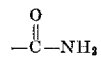

group.

Bands at 7.2 and 9.2 microns present in the spectrogram of the unhydrolyzed polymer are virtually absent in the hydrolyzed polymer.

The poly(1-cyanocyclopentene) as prepared according to my invention is obtained in the polymerization step primarily in the form of the imino polymer shown as Formula I, but may contain traces of amide groups on some terminal cyclopentyl groups. The unhydrolyzed "imino" polymer is characterized by double rings about the same axis, i.e. cyclopentane rings and imino rings. It is a deep orange-colored solid which changes to a pure white solid upon hydrolysis. Both forms may be obtained as amorphous powders at room temperatures. The properties of the polymers in both forms are similar except for the chemical property of the imino polymer of undergoing acid hydrolysis to the colorless amide form. Both polymer forms are substantially completely insoluble in water and in most of the commonly encountered organic solvents including acetone, ethyl acetate, benzene, toluene, lower aliphatic alcohols, e.g. methanol, ethanol, etc., acetonitrile, carbon tetrachloride, chloroform, etc. They are soluble in butyrolactone, dimethyl formamide, ethylene carbonate, concentrated sulfuric acid, concentrated phosphoric acid and concentrated formic acid. The imino polymer, after solution in sulfuric, phosphoric or formic acid, is recovered as the amide form. The amide polymer is insoluble in dilute and concentrated alkalis and acids except concentrated sulfuric, phosphoric and formic acids. For example, it is insoluble in 20% NaOH, and if refluxed for a week in this reagent, is recovered unchanged. Heating overnight with 6 N hydrochloric acid does not dissolve the polymer or change it in any way. Heating the polymer with sulfuric, phosphoric or formic acid dissolves the polymer, but precipitation with a non-solvent permits recovery of the polymer unchanged.

The poly(1-cyanocyclopentene) of my invention, both in unhydrolyzed and hydrolyzed form, is stable against the action of heat so that no discoloration is produced when the polymer is subjected to temperatures up to about 300° C. At temperatures near and above 300° C., the polymer begins to soften and melts with decomposition.

The polymers in both forms are non-crystalline and have high glass transition temperatures. They may be formed into fibres from solution. The amido form of the poly(1-cyanocyclopentene) possesses a unique combination of long, non-polar hydrocarbon chains, containing polar, amide substituents occurring at regular intervals, thus rendering it readily dyed by the common nylon dyes in the usual manner.

The polymers of my invention are useful as coatings for electrical and high temperature insulation, as well as coatings for metals and fabrics, and in the production of textile and other fibres.

In carrying out the polymerization according to my invention, 1-cyanocyclopentene is added to a mixture of polar compound and catalyst at suitable temperature to maintain the polar compound in the liquid phase, whereupon polymerization is immediately initiated and takes place rapidly, accompanied by the production of a deep green color followed by an intense orange color characteristic of poly(1-cyanocyclopentene). The latter precipitates as a yellow-green mass. Upon completion of the polymerization, the solvent is evaporated and a weakly acidic compound is added to destroy the catalyst. The resulting crude polymer may be washed with a non-solvent liquid such as methanol, then dissolved in a solvent for the polymer and purified by one or more precipitations (as with methanol) from the solvent. The polymeric product at this stage is a deep orange color. If a white or colorless polymer is desired, the polymer is hydrolyzed as by treatment in solvent solution with aqueous acid such as hydrochloric or sulfuric acid solutions which breaks the imino rings and converts the imine groups to amide groups as illustrated in Formula II.

The 1-cyanocyclopentene used as the monomer in the present invention is a compound well-known in the art and was prepared by a standard procedure wherein cyclopentanone is treated with an aqueous solution of sodium cyanide in the presence of sodium bisulfite to produce 1-cyano-1-hydroxy-cyclopentane, which was then transformed to 1-cyanocyclopentene by treatment with $POCl_3$ and pyridine.

Suitable catalysts for carrying out the polymerization are the alkali metals such as sodium, potassium or lithium or an organo or other derivative of such alkali metal which yields an alkali metal under the conditions of the reaction, including the alkyl, aryl and amido derivatives, for example, sodium butyl, lithium butyl, sodium triphenylmethyl, sodamide, etc. When one or more of the organo metallic derivatives is used as catalyst, it is usually desirable to dissolve it in a solvent such as n-pentane, n-heptane, etc. The ratio of catalyst to monomer in the reaction mixture is at least about 1:10,000. The proportion of catalyst may be as high as desired. However, as the degree of polymerization in terms of molecular weight of the resulting polymer appears to be inversely proportional to the relative proportion of catalyst, lower proportions of catalyst to monomer promote production of high molecular weight polymers. Higher proportions of catalyst result in lower molecular weight polymers. A catalyst ratio found suitable is of the order of at least about 60 parts of monomer by weight to 1 of catalyst.

The liquid which forms the reaction medium can be any polar compound, liquid at the reaction temperature, which has a dielectric constant high enough to solvate the electron of the metal catalyst and low enough not to provide a proton and thus inhibit polymerization reaction, that is, which dissolves the catalyst to give an electrically conducting solution but does not react therewith. Such compounds have dielectric constants in the liquid phase within the range of reaction temperatures employed, of at least about 15, not more than about 25, preferably between about 20 and about 25. Suitable compounds having such dielectric constants may be represented as $R^7H$ in which $R^7$ is the negative radical or element of the polar compound and include liquid ammonia, in which $R^7$ represents $NH_2$, and organic amines, e.g. ethylene diamine, the methyl amines, etc. One molecule of the polar compound terminates each series of connected imino units. Ammonia, with a dielectric constant of 22 at −34° C., is preferred. Ethylene diamine, with a dielectric constant at 18° C. of 16, provides less complete polymerization than does ammonia.

The temperature of the polymerization reaction may vary widely, temperatures within the range from about −80° C. to about +200° C. are suitable. As lower temperatures appear to favor optimum yields and reaction rates, I prefer to carry out the polymerization at temperatures not substantially higher than about 25° C., preferably within the range between about −80° C. and about −30° C.

While my preferred polymerizations are carried out with 1-cyanocyclopentenes, derivatives of this olefin substituted in the "3" position by non-acidic substituents may be used, such as those illustrated in the structural formula

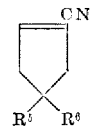

wherein $R^5$ and $R^6$ may be the same or different members of the group consisting of hydrogen, lower alkyl, aryl, aralkyl, alkoxy, amino and thioether radicals.

The polymerization process of my invention is an anionic polymerization and is thus dependent upon the function of a negatively charged catalyst for its propagation. It is thus desirable to avoid the presence in the polymerization medium of proton-producing species, for example, hydrogen ions, which will neutralize the catalyst and terminate the polymerization. Use of monomers such as those illustrated, which contain no groups which are sufficiently acid to react with the alkali metal catalyst will usually accomplish the purpose, although degassing of the monomer or other expedients may be resorted to if appropriate.

The following specific examples further illustrate my invention. Parts and percentages are by weight, and temperatures are in degrees centigrade.

*Example 1*

A reaction vessel fitted with a downward pointing side arm was protected from moisture with sodium hydroxide containing tubes, and flushed with dry nitrogen. A piece of freshly cut sodium (1 part) was placed in the side arm and covered with 16.34 parts anhydrous liquid ammonia. Additional liquid ammonia (65.4 parts) was added to the main body of the reaction vessel, followed by addition of 9.9 parts 1-cyanocyclopentene freshly distilled out of a high vacuum system. At a temperature of −33°, the flask was tipped and allowed 1.33 parts of the sodium-ammonia catalyst solution to run into the main body of the vessel containing the monomer solution. Instantly, a deep green color formed, and simultaneously a yellow-green solid precipitated. The ammonia was permitted to warm to room temperature and evaporate. Ammonium chloride (1 part) was added to destroy the catalyst. The product poly(1-cyanocyclopentene) was rinsed with methanol and precipitated from a butyrolactone solution thrice by the addition of methanol and dried to constant weight at 70° under 1 mm. pressure. A solid, orange polymer was obtained (9.0 parts) in a yield of 90% of theoretical. This polymer was virtually completely insoluble in most of the common organic solvents, including acetone, ethyl acetate, benzene, toluene, methanol, ethanol, acetonitrile, carbon tetrachloride, chloroform, etc. It dissolved in butyrolactone, dimethylformamide, ethylene carbonate and sulfuric acid. It possessed an intrinsic viscosity in butyrolactone of 0.19 at 25°. It was analyzed for carbon, hydrogen and nitrogen with results shown below as compared to theoretical values for poly(1-cyanocyclopentene) $(C_6H_7N)_x$.

|   | Theoretical | Found |
|---|---|---|
| C | 77.4 | 74.8 |
| H | 7.6 | 7.3 |
| N | 15.0 | 14.3 |

Its infrared spectrum is that shown in FIGURE 1 of the drawing.

A portion of the polymer prepared above, was dissolved in wet butyrolactone, and a few drops of 36% hydrochloric acid were added. The addition of excess water (4 parts water to butyrolactone) precipitated the hydrolyzed poly(1-cyanocyclopentene) as a white solid.

The resulting hydrolyzed poly(1-cyanocyclopentene) was analyzed for carbon, hydrogen, nitrogen and oxygen (the latter by difference) with the results given below as compared to theoretical values for $C_6H_9NO$.

|   | Theoretical for completely amidated compound | Found |
|---|---|---|
| C | 64.9 | 71.4 |
| H | 8.1 | 8.2 |
| N | 12.6 | 11.2 |
| O (by difference) | 14.4 | 9.2 |

It had an intrinsic viscosity of about 0.19 and an infrared spectrogram corresponding to FIGURE 2 of the drawings.

It was heated to 300° C. without discoloration and began to melt with decomposition at about this temperature.

The intrinsic viscosity ($\eta i$) disclosed hereinabove is defined as $$\eta i = \frac{\frac{t-t_0}{t_0}}{C}$$

wherein $t$ is the effluent time (usually in seconds) for a given quantity of polymer solution, $t_0$ is the effluent time for an equal quantity of pure solvent of said polymer solution, and C is the concentration of said polymer solution in grams per 100 cm.³ of solution.

Since $$\frac{\frac{t-t_0}{t_0}}{C} \text{ also equals } \frac{\eta sp}{C} C = 0$$

wherein $\eta sp$ is the specific viscosity, $\eta i$ can be readily calculated by plotting $$\frac{\eta sp}{C} vs. C$$

and extrapolating to zero concentration.

*Example 2*

Into one leg of a reaction vessel constructed in the form of an H was placed 1 part of sodium. The vessel was then sealed and degassed for five days at $10^{-5}$ mm. pressure. At the end of this time, 1-cyanocyclopentene (3.8 parts) was added to the other leg of the reaction vessel. Ethylene diamine was now added to both legs of the reaction vessel, 2.9 parts to that leg containing the sodium, and 5.8 parts to that leg containing the monomer. Before all the sodium had dissolved, one-tenth of the catalyst solution was admixed at ambient temperature (Ca 20–25° C.) with the monomer solvent via the cross-section of the H. The reaction mixture was permitted to stand for 10 hours, at the end of which time, the tube was opened and rinsed with ethanol. Precipitation into ethanol yielded a very small quantity of orange, solid, poly(1-cyanocyclopentene). The precipitate was twice dissolved in butyrolactone and precipitated with ethanol. The polymer was then dissolved in a minimum of butyrolactone to which a trace of water had been added. To this, two or three drops of concentrated hydrochloric acid was added to hydrolyze the nitrile groups, then excess water added which precipitated a pale yellow solid. The slurry was centrifuged, the cake rinsed with ethanol, dried in vacuo yielding 0.1 part of poly(1-amidocyclopentene). The product had properties similar to those of the final product of Example 1 except for intrinsic viscosity which appeared to be lower indicating a lower molecular weight.

*Example 3*

When 0.2 part of n-butyl lithium dissolved as a 16% solution in n-pentane is substituted for sodium in Example 1, results similar to those of Example 1 are obtained.

*Example 4*

The process of Example 1 was repeated except that lithium dispersed in mineral oil was employed as the catalyst. A yield of 1.5 parts of hydrolyzed poly(1-cyanocyclopentene) was obtained, having an intrinsic viscosity of 0.1.

*Example 5*

The process of Example 1 was repeated except that potassium was employed as the catalyst in place of sodium. A yield of 1.5 parts of poly(1-cyanocyclopentene) was obtained, from 11.4 parts of monomer.

While the above describes the preferred embodiments of the invention, it will be understood that departures can be made therefrom within the scope of the specification and claims.

I claim:

1. The process for producing a normally solid polymer from 1-cyanocyclopentene as sole monomer, which comprises subjecting said 1-cyanocyclopentene to polymerization in the liquid phase at temperatures between about −80° C. and about +200° C. in the presence of (1) a catalytic proportion of an alkali metal as catalyst and (2) a polar compound selected from the group consisting of ammonia and organic amines liquid at the polymerization temperature and having a dielectric constant between about 15 and about 25.

2. The process for producing normally solid polymers from 1-cyanocyclopentene as sole monomer which comprises subjecting 1-cyanocyclopentene to polymerization in the liquid phase at a temperature between about −80° C. and about +200° C. in the presence of (1) an alkali metal as catalyst and (2) a polar compound selected from the group consisting of ammonia and ethylene diamine.

3. The process according to claim 2 wherein the polar compound is ammonia and the temperature is between about −80° C. and about −30° C.

4. The process according to claim 2 wherein the resulting polymer is subjected to acid hydrolysis.

5. A normally solid polymer from cyanocyclopentene as sole monomer consisting essentially of polymeric compounds selected from the group consisting of

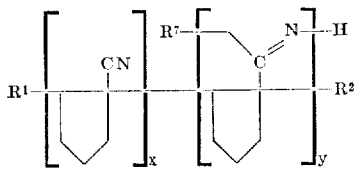

and

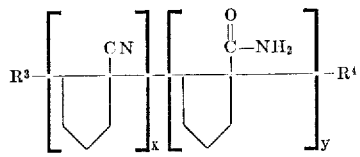

and mixtures thereof, wherein $x$ and $y$ are integers of at least 45 and 15 respectively, the ratio of $x$ to $y$ is at least 3:1, and the $y$ groups occur in connected units of at least three members; $R^1$ represents a member selected from the group consisting of hydrogen, cyanocyclopentyl and iminocyclopentyl radicals, $R^2$ represents a member selected from the group consisting of hydrogen and a cyanocyclopentyl radical, and $R^3$ represents a member selected from the group consisting of hydrogen, cyanocyclopentyl and amidocyclopentyl radicals, $R^4$ represents a member selected from the group consisting of hydrogen and a cyanocyclopentyl radical, $R^7$ is a member selected from the group consisting of —$NH_2$ and the radical of an organic amine having a dielectric constant between about 15 and about 25; said polymers having infrared spectrograms characterized by absorption peaks at 3.35–3.43 microns; 4.44 microns; and 5.93 microns; said polymers being insoluble in any one of the compounds acetone, ethyl actate, benzene, toluene, methanol, ethanol, acetonitrile, carbon tetrachloride, and chloroform; said polymers being soluble in any one of butyrolactone, dimethyl formamide, ethylene carbonate, phosphoric acid, sulfuric acid and formic acid, and said polymers being resistant to decomposition on heating to temperatures up to about 300° C.

6. A normally solid polymer from 1-cyanocyclopentene as sole monomer having the following formula

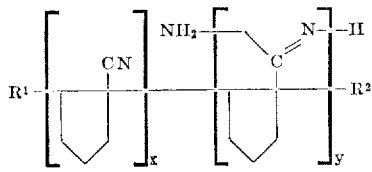

wherein $x$ is at least about 45 and $y$ is at least 15, the ratio of $x$ to $y$ is at least 3:1, and the $y$ groups occur in connected units of at least three members; $R^1$ represents a member selected from the group consisting of hydrogen, cyanocyclopentyl and iminocyclopentyl radicals, $R^2$ represents a member selected from the group consisting of hydrogen and a cyanocyclopentyl radical; said polymer having an infrared spectrogram characterized by absorption peaks at 3.35–3.43 microns; 4.44 microns; 5.93 microns; 7.2 microns; and 9.2 microns; said polymer being insoluble in any one of the compounds acetone, ethyl acetate, benzene, toluene, methanol, ethanol, acetonitrile, carbon tetrachloride and chloroform; said polymer being soluble in any one of butyrolactone, dimethyl formamide, ethylene carbonate, phosphoric acid, sulfuric acid, and formic acid, and said polymer being capable of undergoing acid hydrolysis to replace the imine groups with amide groups.

7. A normally solid polymer from 1-cyanocyclopentene as sole monomer having the following formula

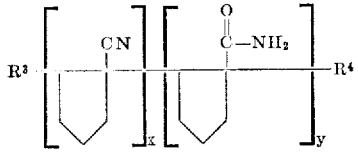

wherein $x$ and $y$ are integers of at least 45 and 15 respectively, the ratio of $x$ to $y$ is at least 3:1, and the $y$ groups occur in connected units of at least three members; $R^3$ represents a member selected from the group consisting of hydrogen and a cyanocyclopentyl radical; said polymer having an infrared spectrogram characterized by absorption peaks at 3.35–3.43 microns; 4.44 microns and at 6.85 microns; said polymer being insoluble in any one of the compounds acetone, ethyl acetate, benzene, toluene, methanol, ethanol, acetonitrile, carbon tetrachloride, chloroform, sodium hydroxide and hydrochloric acid; said polymer being soluble in any one of butyrolactone, dimethyl formamide, ethylene carbonate, phosphoric acid, sulfuric acid and formic acid, and said polymer being chemically inert, and resistant to discoloration on heating to temperatures up to about 300° C.

8. A process for making the polymeric compound of claim 5 which comprises subjecting 1-cyanocyclopentene to the action of an alkali metal polymerization catalyst in catalytic proportion of at least about 1 part per 10,000 parts of monomer at temperatures between about −80° C. and about +25° C., in the presence of a polar compound selected from the group consisting of ammonia and ethylene diamine.

References Cited by the Examiner

UNITED STATES PATENTS 2,608,554   8/52   Bullitt _____ 260—85.5

OTHER REFERENCES

Abrahanse et al.; Chem. Abs., Vol. 51 (1957), page 15422e.

Bennett et al.: Chem. Abs., Vol. 53 (1959), page 10112g.

Migrdichian: The Chemistry of Organic Cyanogen Compounds, Reinhold Publishing Corp., New York (1947), page 90.

JOSEPH L. SCHOFER, *Primary Examiner*.

LOUISE P. QUAST, DONALD E. CZAJA, *Examiners*.